(12) United States Patent  
Homeier et al.

(10) Patent No.: US 7,298,834 B1  
(45) Date of Patent: Nov. 20, 2007

(54) SYSTEM AND METHOD FOR LARGE CAPACITY CONFERENCE CALLS

(75) Inventors: Michael Homeier, Elmhurst, IL (US); Guanglu Wang, Buffalo Grove, IL (US)

(73) Assignee: 3Com Corporation, Marlborough, MA (US)

(*) Notice: Subject to any disclaimer, the term of this patent is extended or adjusted under 35 U.S.C. 154(b) by 1082 days.

(21) Appl. No.: 10/302,241

(22) Filed: Nov. 22, 2002

(51) Int. Cl.
*H04M 3/42* (2006.01)

(52) U.S. Cl. ............... 379/202.01; 370/260; 370/261; 370/265; 370/259

(58) Field of Classification Search ........... 379/202.01; 370/259, 260, 261, 265
See application file for complete search history.

(56) References Cited

U.S. PATENT DOCUMENTS

| | | | |
|---|---|---|---|
| 5,625,407 A * | 4/1997 | Biggs et al. ............. 348/14.11 |
| 6,262,979 B1 | 7/2001 | Anderson et al. |
| 6,304,648 B1 * | 10/2001 | Chang ................... 379/202.01 |
| 6,781,964 B1 * | 8/2004 | Klaghofer ................... 370/261 |
| 7,006,616 B1 * | 2/2006 | Christofferson et al. ...................... 379/202.01 |
| 7,054,820 B2 * | 5/2006 | Potekhin et al. ............ 704/275 |

OTHER PUBLICATIONS

International Telecommunication Union (ITU-T), "Series H: Audiovisual and Multimedia Systems; Infrastructure of Audiovisual Services-Systems and Terminal Equipment For Audiovisual Services", ITU-T Recommendation H.323; Feb. 1998.
International Telecommunication Union (ITU-T), "Specifications of Signalling System No. 7- Application of the ISDN User Part of CCITT Signalling System No. 7 For Innternational ISDN Interconnections", CCITT Recommendation Q.767; 1991.
International Telecommunication Union (ITU-T), "Series Q: Switching and Signalling;Digital Subscriber Signalling System No. 1—Network Layer-ISDN User-Network Interface Layer 3 Specification For Basic Call Control", ITU-T Recommendation Q.931; May 1998.
Internet Engineering Task Force (IETF), Request For Comments (RFC) 2401, "Security Architecture for the Internet Protocol", Nov. 1998.
Internet Engineering Task Force (IETF), Requests For Comments (RFC) 2637, "Point-To-Point Tunneling Protocol (PPTP)", Jul. 1999.
Internet Engineering Task Force (IETF), Requests For Comments (RFC) 2661, "Layer Two Tunneling Protocol 'L2TO'", Aug. 1999.
Internet Engineering Task Force (IETF), Requests For Comments (RFC) 3261, "SIP:Session Initiation Protocol", Jun. 2002.
Internet Engineering Task Force (IETF), Requests For Comments (RFC) 3265, "Session Initiation Protocol (SIP)-Specific event Notification", Jun. 2002.
Internet Engineering Task Force (IETF), Requests For Comments (RFC) 3398, "Integrated Services Digital Network (ISDN) User Part (ISUP) To Session Initiation Protocol (SIP) Mapping", Dec. 2002.

* cited by examiner

*Primary Examiner*—Quynh H. Nguyen
(74) *Attorney, Agent, or Firm*—McDonnell Boehnen Hulbert & Berghoff LLP

(57) ABSTRACT

A system and method for teleconferencing using multiple media mixers is provided. In an exemplary embodiment, a conferencing system may include a conference control server in communication with a central media mixer (CMM) and one or more edge media mixers (EMM). The conference control server may create a media path that connects the CMM and the EMM(s) via a call-control protocol. Additionally, conference participants may communicate with one another by connecting to the CMM and/or the EMM.

23 Claims, 3 Drawing Sheets

SYSTEM AND METHOD FOR LARGE CAPACITY CONFERENCE CALLS

FIELD OF INVENTION

This invention relates to conferencing systems. More specifically, it relates to a system and method for creating a large capacity conferencing system using multiple media mixers.

BACKGROUND OF INVENTION

Modern businesses increasingly use conferencing systems for enabling telecommunications between people around the world. Conference calls involving three or more people are common today, and as the global economy continues to expand, the importance of conferencing systems is expected to grow.

Present conferencing systems often use a media mixer to multiplex audio and/or video data streams into mixed streams that are dispatched to conference participants. Media mixers are typically physical or logical devices having a capacity limitation that restricts the total number of conference participants that can be handled. Thus, the total number of conference participants within a conferencing system is typically limited by the capacity of the media mixer being utilized.

Prior art methods for increasing the call capacity of a conferencing system have included increasing the physical capacity of a media mixer and/or adding a logical control device that can combine media mixers at a physical layer into a larger logical entity. However, both of these methods typically require substantial redesign of a media mixer by a vendor at a relatively high cost. Furthermore, these methods generally create a conferencing system with a static call capacity that a user is unable to change.

Accordingly, it is desirable to have a conferencing system that overcomes the above deficiencies associated with the prior art by utilizing multiple mixers.

SUMMARY

A system and method for teleconferencing using multiple media mixers is provided. An exemplary conferencing system may include one central media mixer (CMM), one or multiple edge media mixers (EMM), and a conference control server in communication with the CMM and the EMMs. The conference control server may create a media path between the CMM and the EMMs, and the media path may be created using a call-control protocol.

In another aspect of the present embodiment, a method for connecting a conference participant to a conference may include receiving a connection request to the conference from the conference participant. Additionally, the method may include determining a CMM and an EMM for the conference. The method may also include connecting the conference participant with the EMM via a call-control protocol, and connecting the EMM with the CMM via the call-control protocol.

In yet another aspect of the present embodiment, a conference control server for use in a teleconferencing system may include a processing unit and a storage unit. The conference control server may use the processing unit to create a first media path between a conference participant and an EMM. Additionally, the conference control server may use the processing unit to create a second media path between the EMM and a CMM.

DETAILED DESCRIPTION

1. Exemplary Conference Call

Figure 1:
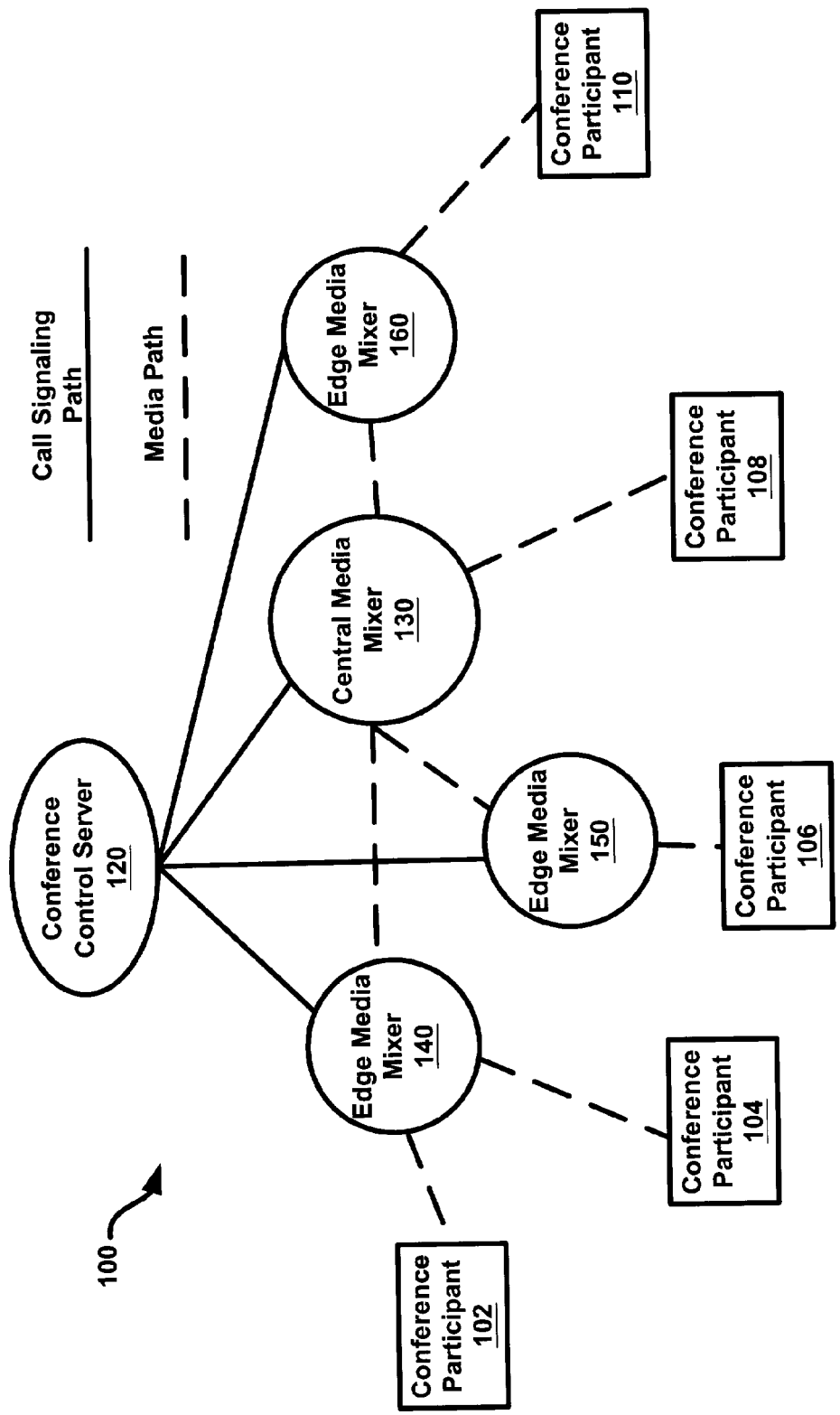
FIG. 1 is a block diagram of an exemplary conferencing system.

In an exemplary conferencing system, conference participants may communicate with one another via a communication mechanism such as audio or video. The conferencing system may include a conference control server for managing the conference(s) taking place. The conferencing system may also include multiple media mixers that are controlled by the conference control server though call signaling paths. The media mixers may have media ports for connecting with one another and with the conference participants.

In an exemplary audio conference, a first conference participant may call a predetermined telephone number to initiate the conference. The conference control server may receive the call and chose one of the media mixers as a central media mixer (CMM) for the conference. Additionally, the conference control server may chose another media mixer as an edge media mixer (EMM), and the conference control server may setup a duplex media path between the EMM and the CMM via a call-control protocol, such as Session Initiation Protocol (SIP), H.323, Integrated Services Digital Network User Part (ISUP), or Q.931 signaling. For more information on SIP, one can refer to Request for Comments (RFC) 3261, "SIP: Session Initiation Protocol", the contents of which are incorporated in their entirety herein by reference.

Once the media path between the EMM and the CMM is setup, the conference control server may forward the connection from the first conference participant to the EMM. As additional participants join the conference, the conference control server may forward the participants' connections to the EMM to enable the participants to communicate with one another. In an alternate embodiment, the conference control server may first connect conference participants to the CMM until almost all of its media ports are being used. At this point, the conference control server may choose an EMM and create a multi-mixer conference by setting up a duplex media path between the EMM and the CMM.

If the number of participants within the conference grows and exceeds the capacity of the EMM, the conference control server may designate a second EMM from available media mixers within the conferencing system. As with the EMM, the conference control server may setup a media path between the second EMM and the CMM via a standard call-control protocol. Once the media path between the second EMM and the CMM is setup, the conference control server may allocate new conference participants to the second EMM.

The exemplary arrangements within the present application may include a number of advantages. For example, the present conferencing systems may increase the potential call capacity of a conference (e.g., the number of potential conference participants) by linking multiple EMMs to a CMM. Furthermore, these conferencing systems may have a dynamic call capacity that an administrator of the conferencing system may change depending on factors such as expected call volume, types of conferences in session, and so forth. Additionally, the present embodiments may utilize a standard, high-level call-control protocol (e.g., SIP) to multiplex multiple media mixers together, without requiring structural change to the conferencing system and without changing other protocols being used.

In addition, the present embodiments may have the advantage of preventing media path loops (e.g., loops that begin and end at the same media mixer) and potential long delays through the use of a star topology. Furthermore, the present embodiments may enable an administrator of a conferencing system to connect various conference participants to different EMMs, so that if a single EMM fails, most connections will still remain intact. Thus, the present embodiments may be less susceptible to mixer failure and thus, be more reliable. Additionally, by shifting intelligence away from the media mixer to the conference control server, the present embodiments may enable the use of simpler and cheaper media mixers while also allowing an administrator to use the conference control server to centrally control conferences.

II. Exemplary Conferencing System

Turning now to the drawings, FIG. 1 is a block diagram overview of an exemplary conferencing system 100. The conferencing system 100 includes a conference control server 120 that communicates with a CMM 130, a first EMM 140, a second EMM 150, and a third EMM 160 via call signaling paths. The conference control server 120 may also communicate with conference participants 102-110 via call signaling paths as well. For ease of reference and sake of clarity, the call signaling paths between the conference control server 120 and the conference participants 102-110 are not explicitly shown in FIG. 1. It should be understood, however, that such call signaling paths are preferably present in the exemplary conference system 100.

As shown in FIG. 1, the EMMs 140-160 communicate with the CMM 130 via media paths. Conference participants 102, 104 may in turn communicate with the CMM 130 via the first EMM 140, and conference participant 106 may in turn communicate with the CMM 130 via the second EMM 150. Furthermore, conference participant 108 may be in direct communication with the CMM 130, and another conference participant 110 may communicate with the CMM 130 via the third EMM 160. It should be understood that any number of conference control servers, media mixers, and conference participants may connect in any fashion within the present conferencing system 100. Additionally, for more information on telecommunications conferencing, one can refer to the commonly owned U.S. Pat. No. 6,262,979, the contents of which are incorporated in their entirety herein by reference.

A. Exemplary Conference Participants

In an exemplary embodiment, the conference participants 102-110 may be telephones (e.g., mobile telephones, wireline telephones), computers, portable electronic devices (e.g., personal digital assistants (PDAs)), or other such telecommunications devices capable of connecting to the conference control server 120 in response to a user action (e.g., dialing the telephone number for the conference control server 120). Additionally, as will be described later in an exemplary embodiment, the conference participants 102-110 may also communicate with one another via the media mixers 130-160.

The conference participants 102-110, the conference control server 120, and/or the media mixers 130-160 may utilize any number of connection mechanisms, such as dial-up (modem), wireless, Ethernet, digital subscriber line (DSL), and cable connection mechanisms. Furthermore, these devices may also employ any number of tunneling mechanisms (e.g., Internet Protocol Security (IPsec), Layer 2 Tunneling Protocol (L2TP), Point-to-Point Tunneling Protocol (PPTP)). Also, communications between the conference participants 102-110, the conference control server 120, and/or the media mixers 130-160 may involve any number of different call-control protocols, such as SIP, H.323, ISUP signaling, and Q.931

1. Exemplary Input Device

In an exemplary embodiment, each of the conference participants 102-110 may include an input device (e.g., microphone) for receiving audio information from a user and converting the audio information into electrical data signals. Alternatively, the input device may receive other types of sensory information (e.g., video, tactile-based signals), or no sensory information might be received.

2. Exemplary I/O Device

Additionally, each of the conference participants 102-110 may include input/output (I/O) devices for electrically sending and receiving data with the conference control server 120 and/or the media mixers 130-160. For example, the conference participants 102-110 may send connection requests to the conference control server 120 when connecting to a conference. The connection requests may include various types of identification information, such as a personal identification number (PIN), username, password, and/or name of the conference. The conference control server 120 may use the connection requests to authenticate the conference participants 102-110, or alternatively, forward the connection requests to an authentication server (not shown) for authenticating the participants 102-110.

Additionally, the conference participants 102-110 may use their I/O devices to send data signals to one another via the media mixers 130-160. The data signals may include, for example, the sensory information received from the input devices (e.g., audio). Additionally, the data signals may be multiplexed together so that, for example, a conference participant (e.g., conference participant 102) may simultaneously receive data signals from any number of the other conference participants (e.g., conference participants 104-110).

3. Exemplary Packet Controller

Furthermore, each of the conference participants 102-110 may also include a packet controller for generating packets (e.g., Transmission Control Protocol/Internet Protocol (TCP/IP) and/or Universal Datagram Protocol (UDP)/IP packets) corresponding to the connection requests and/or the data signals. Additionally, the packet controller may forward the generated packets to the I/O device for transmission to the conference control server 120 and/or the media mixers 130-160. The packet controller may also combine packets received by the I/O device for producing multiplexed audio signals. Additionally, the conference participants 102-110 may send and/or receive unicast and/or multi-cast packets with any device in the conferencing system 100. Although the present embodiments describe exemplary packet-based communications involving the conference participants 102-110, it should be understood that non-packet-based communications (e.g., circuit switching) may additionally or alternatively be utilized.

It should also be understood that the conference participants 102-110 may include more or fewer components in alternate embodiments, and that the functionality of the conference participants 102-110 may be distributed to other components within the conferencing system 100.

B. Exemplary Conference Control Server

The conference control server 120 may include any type of server or media control unit that can communicate with the conference participants 102-110 and the media mixers 130-160. In the present embodiment, the conference control server 120 may be responsible for media path setup and teardown between the conference participants 102-110 and/or the media mixers 130-160.

The exemplary conference control server 120 may include a processing unit and a storage unit, as well as interfaces for communicating with the conference participants 102-110 and media mixers 130-160. In the present embodiment, the conference control server 120 may be an Interactive Voice Response (IVR) server, such as the CommWorks 8251 IVR server, which is commercially available from the assignee of the present application, 3COM Corporation. It should be understood that the conference control server 120 specified here is meant to illustrate, not limit, the present embodiment, and that the conference control server 120 may be a different type of server or computing device.

The processing unit within the exemplary conference control server 120 may include any type of processing mechanism, such as a central processing unit (CPU) or microprocessor fabricated on a silicon chip. The storage unit may include any type of storage mechanism, such as a static read-only memory (SRAM), dynamic read-only memory (DRAM), buffer, magnetic hard disk drive, or optical memory. In an exemplary embodiment, the storage unit may include a relational database that matches, for example, a username to a password and/or a conference name. In this regard, a conference participant may provide identification information to the conference control server 120, and the conference control server 120 may use the relational database to identify which conference the participant should connect to and/or whether the participant should be authorized to access that conference. Alternatively, the conference control server 120 may send the identification information to an authentication server (not shown) that includes the storage unit and performs this authentication functionality.

1. Exemplary Determination of CMM and EMMs

Additionally, the conference control server 120 may determine the CMM and EMMs that are used for a conference. In an exemplary scenario, the conference control server 120 may arbitrarily determine which media mixer should be the CMM and/or EMM, such as through a random or pseudorandom selection (e.g., by sampling a system clock used by the processing unit).

In an alternate embodiment, the conference control server 120 may use various characteristics of media mixers within the conferencing system 100 to determine the CMM and/or EMM. To illustrate, in an exemplary scenario, the conference control server 120 may determine an available call capacity for each of the media mixers within the conferencing system 100. The available call capacity for a mixer may be defined as the number of additional calls that the mixer can handle. Thus, the available call capacity for a media mixer may be determined by subtracting its currently-used call capacity (e.g., current number of media ports in use) from its maximum call capacity (e.g., total number of usable media ports). The currently-used call capacity may be determined through registration messages sent back from the media mixers. The registration messages may be sent, for example, at regular time intervals, or after the status of the currently-used capacity has changed (e.g., the usage of a media mixer has changed by a certain percentage, or the number of people using the media mixer has changed by a certain amount). The maximum call capacity of the media mixers may be determined, for instance, by querying a database within the conference control server 120.

Continuing with this exemplary scenario, the CMM can be chosen as the media mixer that has the largest available call capacity (e.g., the largest difference between the maximum call capacity and the currently-used call capacity). Similarly, the EMM may be chosen as the media mixer having the second largest available call capacity. Of course, it should be understood that any media mixer having free media ports may be chosen for the CMM and/or the EMM, and that any criteria may be applied when decided which media mixers to employ. To illustrate, in an exemplary scenario, the conference control server 120 may choose any media mixer that has available media ports as the CMM.

2. Exemplary Distribution of Conference Participants Across Different EMMs

Additionally, in another exemplary scenario, the conference control server 120 may limit the risk of media mixer failure by distributing conference participants across multiple EMMs. To illustrate, in the exemplary conferencing system 100 shown in FIG. 1, the five (5) conference participants 102-110 are connecting to four (4) different media mixers 130-160. Thus, if one of the EMMs fails (e.g., EMM 150), only one or two conference participants (e.g., conference participant 106) may be disconnected from the CMM 130, while the other conference participants (e.g., conference participants 102-104 and 108-110) and EMMs (e.g., EMMs 140, 160) maintain their connections with the CMM 130. In such a scenario, a conference may proceed in a relatively uninterrupted fashion, since the failure of a single EMM may result in the loss of at most a few participants. Accordingly, such a configuration may provide for a more reliable way to conduct conference calls.

3. Exemplary Conference Priorities

Additionally, the conference control server 120 may use priority levels to offer different levels of service within different conferences. For example, the conference control server 120 may assign higher capacity media mixers and/or more media mixers to a high priority conference (e.g., a high-capacity conference or premium-level conference) than to a lower priority conference. Additionally, the conference control server 120 may store priority information pertaining to a conference and correlate the priority information, for example, to the identification information for the conference participants. It should be understood that any number and type of priority levels may be used with the present embodiment.

4. Exemplary Additional Services

In addition to authenticating a new conference participant and determining a CMM and/or EMMs, the conference control server 120 may be responsible for a variety of other services, such as inviting the conference participants 102-110 to initiate a new conference or join an ongoing conference, creating media paths (e.g., data links) between the media mixers 130-160, connecting the conference participants among the different media mixers, and so forth. Details concerning some of these services will be provided later during a discussion of exemplary messaging within the present embodiment.

C. Exemplary Media Mixers

The CMM 130 and the EMMs 140-160 may each be any type of media mixing device that combines data signals (e.g., multiplexes audio data signals) received from the conference participants 102-110. In the present embodiment, the CMM 130 and/or the EMMs 140-160 may be a Voyant Readivoice server, though it should be understood that any number of other types of mixing devices may alternatively be used for the media mixers 130-160.

The mixing device is used for mixing multiple sources of media stream into one, after proper trans-coding/decoding, volume balancing, timing, and so on, as well as dispatching mixed media stream into multiple destinations. The mixing device preferably has powerful hardware to perform the time-critical media processing task, and a control interface through which the conference control server can send commands to instruct which media streams need to be mixed together, what the sources of the media streams are, what the destination of the media streams are, and when the mixing should start, pause and terminate.

1. Exemplary Star Configuration

In the present embodiment, the media mixers 130-160 are preferably arranged in a star configuration, with the CMM 130 at the center and the EMMs 140-160 connected directly to the CMM 130. In this star configuration, signals sent and received from the conference participants 102-110 preferably travel through at most three media mixers. Thus, the star configuration may reduce signal delay between conference participants. Additionally, the star configuration may help prevent media path loops (e.g., loops that begin and end at the same media mixer) from occurring, since the EMMs 140-160 preferably connect to one another via the CMM 130.

In addition, the use of a star configuration may greatly increase the capacity of a conferencing system. To illustrate, if each media mixer within an exemplary conferencing system has a maximum capacity of 100 media ports, a configuration that only uses a single media mixer may only have 100 participants in a conference. However, in a star configuration, where 100 different edge media mixers connect to the 100 media ports of the central media mixer, the configuration may have a total of 100*(100−1)=9900 media ports available (i.e., the 100 EMMs each have 99 media ports available). Thus, it is evident that the star configuration can greatly increase the capacity of a conferencing system. It should also be noted that other media mixer configurations (e.g., chain, tree structure, etc.) may additionally or alternatively be employed within the present embodiment.

2. Exemplary Media Paths

In the present embodiment, a media mixer may treat a media path to another media mixer similar to a media path to a conference participant. Thus, for example, the CMM 130 may treat data received from the EMMs 140-160 similar to data received from the conference participant 108. Likewise, the EMMs 140-160 may treat data received from the CMM 130 similar to data received from the conference participants 102-106, 110.

Further in the present embodiment, even as additional conference participants connect to the EMMs 140-160, additional media paths between the EMMs 140-160 and the CMM 130 are not required to be created. Thus, the additional conference participants may share the same existing media paths that connect the EMMs 140-160 to the CMM 130.

3. Exemplary Multiple Conferences

Additionally, it should be understood that multiple different conferences may be ongoing among the media mixers, and that the logic connecting the media mixers together may vary in different conferences. For example, in a first conference, a given media mixer may be a CMM that connects to one or more EMMs. In a second conference occurring at the same time as the first conference, the given media mixer may instead be an EMM. Further, in a third ongoing conference, the given media mixer might not be utilized at all. Thus, it should be evident that the roles and connectivity of any given media mixer within the conferencing system 100 may simultaneously vary from conference to conference.

III. Exemplary Initiation of a Conference Call

Figure 2:
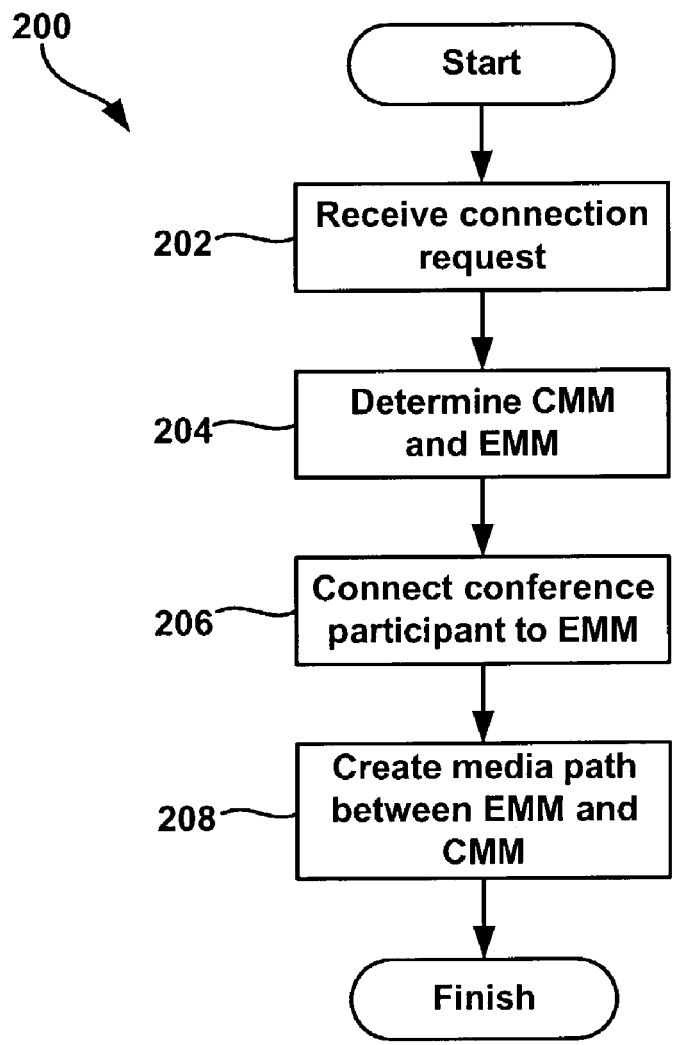
FIG. 2 is a flow chart for an exemplary method of establishing a conference call within the conferencing system of FIG. 1.

Turning now to FIG. 2, an exemplary method 200 of initiating a conference within the conferencing system 100 is shown. Although the present method 200 describes initiating a conference using the conference participant 102, the conference control server 120, the CMM 130, and the EMM 140, it should be understood that the method 200 may alternatively be applied to any of the other devices within the conferencing system 100.

In step 202, the conference control server 120 may receive a connection request from the conference participant 102 requesting a connection to a conference. In the present exemplary scenario, the conference participant 102 may be the first device to join the conference, and thus, the connection request may initiate the conference. The conference control server 120 may use identification information within the connection request (e.g., PIN, conference identification number, username, password, etc.) for authenticating the conference participant 102 and determining the conference where the conference participant 102 should connect.

In step 204, the conference control server 120 may arbitrarily or selectively determine a central media mixer and an edge media mixer for the conference, which may be the CMM 130 and EMM 140, respectively, in the present embodiment. Alternatively, the conference control server 120 may select a single mixer (e.g., a central media mixer) for the conference. In such a scenario, the conference control server 120 may wait until the capacity of the single mixer is saturated before selecting an additional mixer for connecting to the single mixer.

In step 206, the conference control server 120 may connect the conference participant 102 to the EMM 140 via a media path. Exemplary messaging used during this step will be described in more detail shortly. In step 208, the conference control server 120 may create a media path between the EMM 140 and the CMM 130. Preferably, the media path enables the EMM 140 and the CMM 130 to send and receive data signals within one another via a standard call-control protocol, such as SIP. Additionally, the conference participant 102 may use the media path to send and receive data signals with future conference participants that connect to the CMM 130 and/or the EMM 140.

IV. Exemplary Addition of an Edge Media Mixer to a Conference

Figure 3:
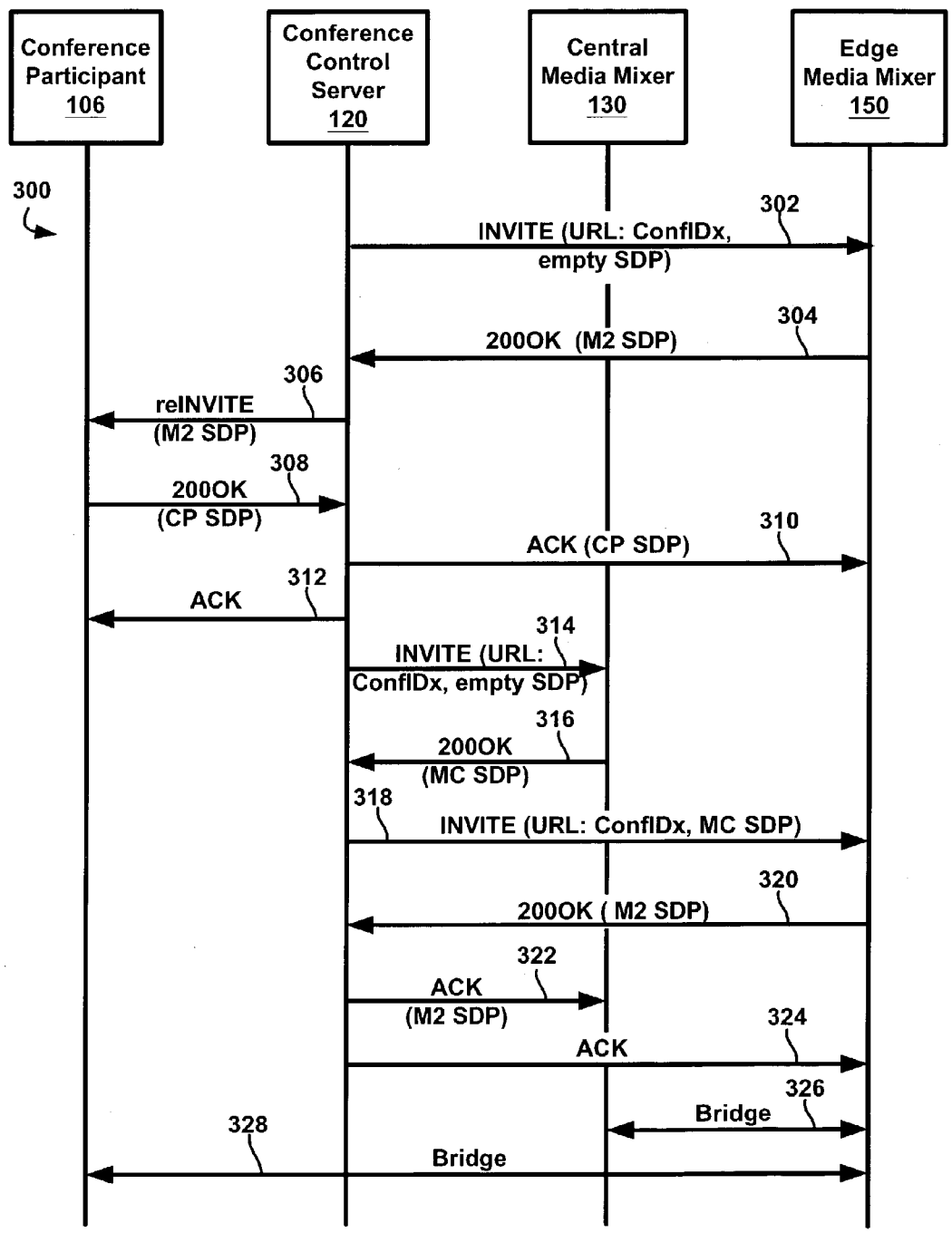
FIG. 3 is a data flow diagram for an exemplary method of adding an edge media mixer to the conferencing system of FIG. 1.

Turning now to FIG. 3, an exemplary data flow diagram illustrates a method 300 for adding the EMM 150 to an ongoing conference using messages 302-324 that are sent between the conference participant 106, the conference control server 120, the CMM 130 and the EMM 150. In the present embodiment, the conference participant 106 may seek to connect to an ongoing conference that involves the CMM 130 and the EMM 140, as described in the exemplary method 200. Detecting that the capacity of the EMM 140 is saturated (e.g., the EMM 140 has no available media ports), the conference control server 100 may connect an additional edge media mixer (e.g., EMM 150) to the conference for handling the new conference participant 106.

Prior to sending the messages 302-324, the new conference participant 106 may have dialed into the conference control server 120 and been authenticated. Additionally, although each of the messages 302-324 in the present embodiment involves SIP, it should be understood that other types of call-control protocols may alternatively be used. Furthermore, in the present embodiment, the messages 302-312 may establish a media path (e.g., bridge 328) between the conference participant 106 and the EMM 150, and messages 314-324 may establish a media path (e.g., bridge 326) between the EMM 150 and the CMM 130. It should be understood that the media path between the EMM 150 and the CMM 130 may be created prior to, after, or simultaneously with the creation of the media path between the conference participant 106 and the EMM 150.

A variety of different types of messages may be sent when establishing the media path between the conference participant 106 and the EMM 150. In message 302, the conference control server 120 may send an invitation message (e.g., "INVITE (URL: ConfIDx, empty SDP)") to the EMM 150 in order to invite the EMM 150 to join the ongoing conference. Within the invitation message 302, the conference control server 120 may identify the conference (e.g., "ConfIDx"), and have a null field for the session information used for connecting to the conference control server 120 (e.g., "empty SDP").

In message 304, the EMM 150 may provide a response to the invitation message 302. For example, in the present embodiment, the EMM 150 may provide a "200OK (M2 SDP)" SIP message, which the EMM 150 uses to indicate that it will connect to the conference (e.g., "URL: ConfIDx"). Furthermore, the response message 304 may include a session information field that provides information about connecting to the EMM 150 (e.g., "M2 SDP", where "M2 SDP" represents session information for the second EMM 150). It should be understood that the formatting of this message may vary in alternate embodiments.

In message 306, the conference control server 120 may reinvite the conference participant 106 to connect directly to the EMM 150 via the message "reINVITE (M2 SDP)". The reinvitation message 306 may also include a session information field (e.g., "M2 SDP") that includes the session information for the EMM 150.

In message 308, the conference participant 106 may provide a response (e.g., "200OK (CP SDP)") to the reinvitation message 306. The response message 308 may include a session information field that includes session information corresponding to the conference participant 106 (e.g., "CP SDP"). The response message 308 may have a substantially similar format to the response message 304, though this may vary in alternate embodiments.

In message 310, the conference control server 120 may send an acknowledgement message 310 to the EMM 150 (e.g., "ACK (CP SDP)"). The acknowledgment message 310 may include session information for the conference participant 106 that was received by the conference control server within the message 308. Additionally, the conference control server 120 may send an acknowledgement message 312 (e.g., "ACK") to the conference participant 106. Thus, preferably after the acknowledgement message 312 is sent, a media path (e.g., "bridge 328") may be present between the conference participant 106 and the EMM 150.

In the present embodiment, after the bridge 328 is established, a media path (e.g. "bridge 326") may be established between the conference control server 120 and the EMM 150 through messages 314-324. In message 314, the conference control server 120 may invite the CMM 130 to connect to the new EMM 150 (e.g., "INVITE (URL: ConfIDx, empty SDP)"). In message 316, the CMM 130 may send a response to the conference control server 120 providing session information for the CMM 130 (e.g., "200OK MC SDP", where "MC SDP" denotes session information for the CMM 130).

In message 318, the conference control server 120 may invite the EMM 150 to connect to the CMM 130 (e.g., "INVITE (URL: ConfIDx, MC SDP)"). Furthermore, in message 320, the EMM 150 may respond to the invitation message 318 and provide session information (e.g., "200OK M2 SDP"), similar to the message 304. In message 322, the conference control server 120 may send an acknowledgement to the CMM 130, which may include the session information for the EMM 150 (e.g., "ACK (M2 SDP)"). In step 324, the conference control server 120 may also send an acknowledgement to the EMM 150. Thus, at this point, a media path (e.g., "bridge 326") may be present between the EMM 150 and the CMM 130. Furthermore, since the EMM 150 is also connected to the conference participant 106 via the bridge 328, the conference participant 106 may now communicate with any conference participant connected to the CMM 130, the first EMM 140, and/or the second EMM 150 (e.g., conference participants 102, 104, 108). It should be understood that the present embodiment may be repeated any number of times to connect any number of conference participants and/or edge media mixers to the CMM 130.

The exemplary arrangements within the present application may include a number of advantages. For example, the present conferencing systems may increase the potential call capacity of a conference (e.g., the number of potential conference participants) by linking multiple EMMs to a CMM. Furthermore, these conferencing systems may have a dynamic call capacity that an administrator of the conferencing system may change depending on factors such as expected call volume, types of conferences in session, and so forth. Additionally, the present embodiments may utilize a standard, high-level call-control protocol (e.g., SIP) to multiplex multiple media mixers together, without requiring structural change to the conferencing system and without changing other protocols being used.

In addition, the present embodiments may have the advantage of preventing media path loops (e.g., loops that begin and end at the same media mixer) and potential long delays through the use of a star topology. Furthermore, the present embodiments may enable an administrator of a conferencing system to connect various conference participants to different EMMs, so that if a single EMM fails, most connections will still remain intact. Thus, the present embodiments may be less susceptible to mixer failure and thus, have a higher reliability. Additionally, by shifting intelligence away from the media mixer to the conference control server, the present embodiments may enable the use of simpler and cheaper media mixers while also allowing an administrator to use the conference control server to centrally control conferences.

It should be understood that a wide variety of additions and modifications may be made to the exemplary embodiments described within the present application. For example, more or fewer components (e.g., conference participants, conference control servers, media mixers, linking mechanisms, etc.) may be utilized with the conferencing system 100 depending on its desired functionality. Further, in an alternate embodiment, an EMM may connect to one or more other EMMs in addition to connecting to the CMM, thus enabling other media mixer configurations (e.g., chains, tree structures). Additionally, the type, number, and format of messages used within the method 300 may vary depending on consumer, manufacturing, and/or administrator preferences. It is therefore intended that the foregoing description illustrates rather than limits this invention and that it is the following claims, including all of the equivalents, which define this invention:

What is claimed is:

1. A conferencing system comprising:
    a plurality of media mixers in connection with a plurality of participants to receive data signals during a conference call, the plurality of media mixers including at least a first edge media mixer, a second edge media mixer, and a central media mixer;
    a conference control server in communication with the central media mixer, the first edge media mixer, and the second edge media mixer via a call signaling path;
    a first media path between the central media mixer and the first edge media mixer, the first media path being created by the conference control server via a call-control protocol; and
    a second media path between the central media mixer and the second edge media mixer, the second media path being created by the conference control server via a call-control protocol;
    wherein all data signals sent from a participant to the first edge media mixer travel on the first media path and through the central media mixer, before being transmitted on the second media path to the second edge media mixer and at least one of its connected participants.

2. The conferencing system of claim 1 wherein a participant may be directly connected to the central media mixer.

3. The conferencing system of claim 1 wherein more than one participant is in communication with a single edge media mixer.

4. The conferencing system of claim 1, wherein the central media mixer is the center of a star configuration that includes the first edge media mixer, the second edge media mixer, and a third edge media mixer.

5. The conferencing system of claim 1, wherein the call-control protocol comprises at least one of a Session Initiation Protocol, H.323 standard, Integrated Services Digital Network User Part protocol, and Q.931 signaling.

6. The conferencing system of claim 1 wherein the conference control server arbitrarily chooses the central media mixer from the plurality of media mixers.

7. The conferencing system of claim 1 wherein the conference control server chooses the central media mixer from the plurality of media mixers based on a currently-used call capacity and a maximum call capacity for each of the plurality of media mixers.

8. The conferencing system of claim 7, wherein the conference control server determines the currently-used call capacity via registration messages sent from the plurality of media mixers, and the conference control server determines the maximum call capacity by querying a database.

9. The conferencing system of claim 1, wherein the first edge media mixer combines audio data received from participants into multiplexed audio data that is sent to the central media mixer.

10. A method for connecting a conference participant to a conference, the method comprising:
    providing a plurality of media mixers in connection with a plurality of participants to receive data signals during a conference call, the plurality of media mixers including at least a first edge media mixer, a second edge media mixer, and a central media mixer;
    receiving a connection request to a conference from a conference participant;
    connecting the conference participant with the first edge media mixer via a call-control protocol;
    connecting the first edge media mixer with the central media mixer via the call-control protocol
    connecting the second edge media mixer with the central media mixer via the call-control protocol; and
    sending all data signals sent from a conference participant to the first edge media mixer on a first media path travel through the central media mixer before being transmitted to the second edge media mixer on a second media path.

11. The method of claim 10, wherein the step of connecting the conference participant with the first edge media mixer via the call-control protocol comprises:
    inviting the first edge media mixer to connect with the conference participant;
    receiving session information for the first edge media mixer;
    forwarding the session information for the first edge media mixer to the conference participant;
    receiving session information for the conference participant; and
    forwarding the session information for the conference participant to the first edge media mixer.

12. The method of claim 10, wherein the step of connecting the first edge media mixer with the central media mixer via the call-control protocol comprises:
    receiving session information for the central media mixer;
    forwarding the session information for the central media mixer to the first edge media mixer;
    receiving session information for the first edge media mixer; and
    forwarding the session information for the first edge media mixer to the central media mixer.

13. The method of claim 10, wherein the step of providing a central media mixer comprises choosing the central media mixer from the plurality of media mixers in a pseudorandom manner.

14. The method of claim 10, wherein the call-control protocol comprises at least one of a Session Initiation Protocol, H.323 standard, Integrated Services Digital Network User Part protocol, and Q.931 signaling.

15. The method of claim 10 further comprising authenticating the conference participant.

16. The method of claim 10 further comprising determining a priority of the conference.

17. The method of claim 10, wherein the conference participant comprises at least one of a telephone, computer, and portable electronic device.

18. The method of claim 17, wherein the conference participant further comprises an input device, input/output device, and packet controller.

19. The method of claim 10 further comprising:
    receiving a connection request to the conference from a second conference participant;
    comparing a currently-used call capacity for the first edge media mixer with a maximum call capacity for the edge media mixer;

connecting the second conference participant with the first edge media mixer via the call-control protocol if the currently-used call capacity is less than the maximum call capacity; and connecting the second conference participant with the second edge media mixer via the call-control protocol if the currently-used call capacity is equal to the maximum call capacity.

20. The method of claim 10 further comprising a computer readable medium having stored therein instructions for causing a processor to execute the steps of the method of claim 10.

21. A conference control server for use in a teleconferencing system, the conference control server comprising:

a processing unit; and a storage unit;

wherein the conference control server uses the processing unit to create a first media path between a conference participant and a first edge media mixer, and the conference control server uses the processing unit to create a second media path between the first edge media mixer and a media mixer which has been chosen as a central media mixer; and wherein all data signals sent from a conference participant to the first edge media mixer on the first media path travel through the central media mixer before being transmitted to a second edge media mixer.

22. The conference control server of claim 21, wherein the conference control server authenticates the conference participant by comparing session information received from the conference participant to authentication data stored within the storage unit.

23. The conference control server of claim 21, wherein the storage unit comprises a relational database.

* * * * *